(12) United States Patent
Kawana et al.

(10) Patent No.: US 11,460,994 B2
(45) Date of Patent: Oct. 4, 2022

(54) INFORMATION PROCESSING APPARATUS AND INFORMATION PROCESSING METHOD

(71) Applicant: SONY CORPORATION, Tokyo (JP)

(72) Inventors: Yousuke Kawana, Tokyo (JP); Kentaro Ida, Tokyo (JP); Maki Imoto, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/640,533

(22) PCT Filed: Jun. 8, 2018

(86) PCT No.: PCT/JP2018/022078
§ 371 (c)(1),
(2) Date: Feb. 20, 2020

(87) PCT Pub. No.: WO2019/044104
PCT Pub. Date: Mar. 7, 2019

(65) Prior Publication Data
US 2020/0356244 A1    Nov. 12, 2020

(30) Foreign Application Priority Data
Aug. 31, 2017 (JP) .............................. JP2017-167119

(51) Int. Cl.
*G06F 3/04847* (2022.01)
(52) U.S. Cl.
CPC .................. *G06F 3/04847* (2013.01)

(58) Field of Classification Search
CPC ... G06F 3/04847; G06F 3/01; G09G 2354/00; G09G 3/002; G09G 5/00; G03B 21/14
See application file for complete search history.

(56) References Cited

U.S. PATENT DOCUMENTS

2006/0139314 A1    6/2006  Bell
2016/0025327 A1    1/2016  Abe et al.
(Continued)

FOREIGN PATENT DOCUMENTS

CN    102457617 A    5/2012
CN    103313080 A    9/2013
(Continued)

OTHER PUBLICATIONS

International Search Report and Written Opinion of PCT Application No. PCT/JP2018/022078, dated Aug. 21, 2018, 09 pages of ISRWO.

(Continued)

*Primary Examiner* — Jennifer N Welch
*Assistant Examiner* — Ashley M Fortino
(74) *Attorney, Agent, or Firm* — Chip Law Group

(57) ABSTRACT

An information processing apparatus includes a setting unit that sets setting information including notification information from a first user to a second user, an output location of the notification information in a physical space, and a notification condition that is a condition for outputting the notification information, and an output control unit that controls an output device to output the notification information to the output location when the notification condition is satisfied, based on the setting information set by the setting unit.

18 Claims, 11 Drawing Sheets

(56) References Cited

U.S. PATENT DOCUMENTS

| | | | |
|---|---|---|---|
| 2017/0160626 A1 | 6/2017 | Muramatsu | |
| 2017/0235376 A1 | 8/2017 | Katz et al. | |
| 2017/0307907 A1* | 10/2017 | Hart | A61B 5/163 |
| 2018/0046434 A1* | 2/2018 | Noble | G06F 3/167 |
| 2018/0306431 A1 | 10/2018 | Watanabe et al. | |

FOREIGN PATENT DOCUMENTS

| | | |
|---|---|---|
| CN | 104777989 A | 7/2015 |
| CN | 104781782 A | 7/2015 |
| CN | 107923582 A | 4/2018 |
| JP | 2000-330882 A | 11/2000 |
| JP | 2003-085100 A | 3/2003 |
| JP | 2014-021428 A | 2/2014 |
| JP | 6613458 B2 | 12/2019 |
| JP | 6665194 B2 | 3/2020 |
| WO | 2007/019443 A1 | 2/2007 |
| WO | 2011/127578 A1 | 10/2011 |
| WO | 2014/171134 A1 | 10/2014 |
| WO | 2016/103560 A1 | 6/2016 |
| WO | 2017/056147 A1 | 4/2017 |

OTHER PUBLICATIONS

Extended European Search Report of EP Application No. 18851621.5, dated Jul. 27, 2020, 12 pages.

Office Action for CN Patent Application No. 201880054591.7, dated Feb. 8, 2022, 14 pages of English Translation and 11 pages of Office Action.

Office Action for JP Patent Application No. 2019-538990, dated May 17, 2022, 04 pages of English Translation and 04 pages of Office Action.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/022078 filed on Jun. 8, 2018, which claims priority benefit of Japanese Patent Application No. JP 2017-167119 filed in the Japan Patent Office on Aug. 31, 2017. Each of the above-referenced applications is hereby incorporated herein by reference in its entirety.

FIELD

The present disclosure relates to an information processing apparatus, an information processing method, and a program.

BACKGROUND

In recent years, terminal devices capable of user interaction, such as smartphones and tablet terminals, have become widespread. In addition, user interfaces have been diversified. For example, touch panels, gesture input devices, and voice input devices are widely used. Technology for achieving new user interaction using such various terminal devices or user interfaces is proposed.

For example, Patent Literature 1 below discloses a technique for displaying a message on the floor at the moment when a user comes home and turns on a light by linking a projector mounted on the ceiling of the room and a lighting switch.

CITATION LIST

Patent Literature

Patent Literature 1: JP 2014-21428 A

SUMMARY

Technical Problem

However, the technique described in Patent Literature 1 has a limited information notification method. For example, the trigger for displaying information is limited to operating a lighting switch, and the information display location is limited to the floor on which the user is located. In consideration of user convenience, it is desirable to achieve user interaction with a higher degree of freedom.

To address this, the present disclosure provides a framework of user interaction with a higher degree of freedom in a physical space.

Solution to Problem

According to the present disclosure, an information processing apparatus is provided that includes:
a setting unit that sets setting information including notification information from a first user to a second user, an output location of the notification information in a physical space, and a notification condition that is a condition for outputting the notification information; and
an output control unit that controls an output device to output the notification information to the output location when the notification condition is satisfied, based on the setting information set by the setting unit.

Moreover, according to the present disclosure, an information processing method is provided that includes:
setting information including notification information from a first user to a second user, an output location of the notification information in a physical space, and a notification condition that is a condition for outputting the notification information; and
controlling an output device to output the notification information to the output location when the notification condition is satisfied, based on the setting information set.

Moreover, according to the present disclosure, a program is provided that causes a computer to function as:
a setting unit that sets setting information including notification information from a first user to a second user, an output location of the notification information in a physical space, and a notification condition that is a condition for outputting the notification information; and
an output control unit that controls an output device to output the notification information to the output location when the notification condition is satisfied, based on the setting information set by the setting unit.

Advantageous Effects of Invention

As described above, the present disclosure provides a framework of user interaction with a higher degree of freedom in a physical space. Note that the advantageous effects described above are not necessarily limiting, and any of the effects illustrated in the present specification or other effects that can be learned from the present specification may be achieved in addition to or in place of the advantageous effects described above.

DESCRIPTION OF EMBODIMENTS

Figure 1:
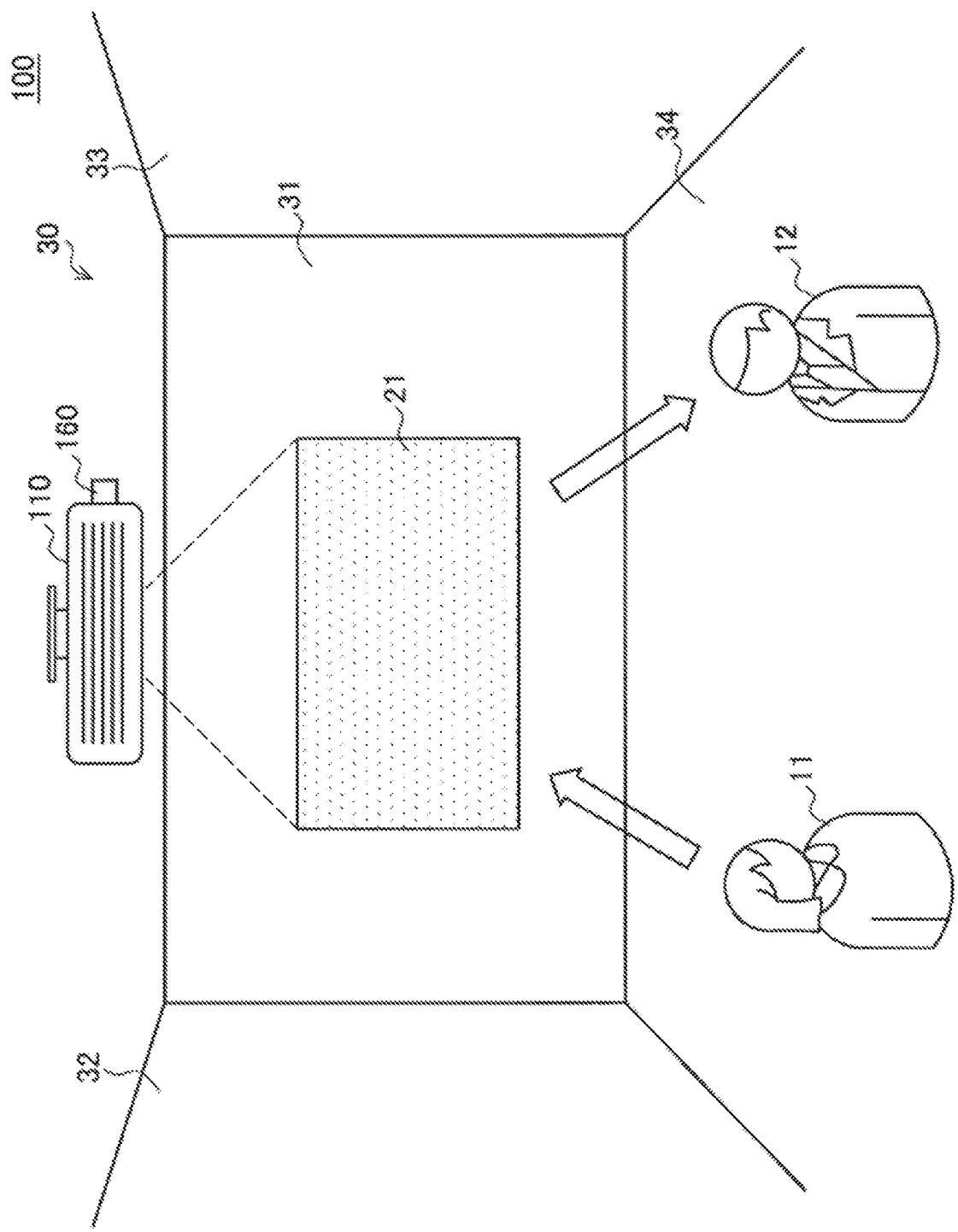
FIG. 1 is a diagram illustrating an example of a configuration of an information processing system according to an embodiment of the present disclosure.

Hereinafter, preferred embodiments of the present disclosure will be described in detail with reference to the accompanying drawings. In the present specification and the drawings, components having substantially the same functional configuration will be denoted with the same reference numerals and redundant description will be omitted.

The description will be made in the following order.
1. Outline of information processing system
2. Configuration example
3. Technical features
3.1. Contents of various types of information
3.2. Setting information setting process
3.3. Notification information output process
4. Application examples
5. Hardware configuration example
6. Conclusion

1. OUTLINE OF INFORMATION PROCESSING SYSTEM

A configuration of an information processing system according to an embodiment of the present disclosure will be described with reference to FIG. 1. FIG. 1 is a diagram illustrating an example of a configuration of an information processing system according to an embodiment of the present disclosure.

Referring to FIG. 1, an information processing system 100 according to an embodiment of the present disclosure includes an input unit 110 and an output unit 160. The input unit 110 and the output unit 160 are installed in a physical space 30.

The physical space 30 is a physical space in which users (11, 12) can make an operation within the space. The physical space 30 may be a closed space such as indoors, or may be an open space such as outdoors. In the present specification, the physical space is assumed to be a living space such as a room, entrance, hallway, or kitchen in a house.

The output unit 160 is a device that maps and displays various types of information on an arbitrary surface of the physical space 30, thereby visually notifying the users of the information. As the output unit 160, for example, a projector is used. In the example illustrated in FIG. 1, the output unit 160 is disposed above the physical space 30 in a state of being suspended from the ceiling, for example, and projects a screen 21 onto a wall 31.

The input unit 110 is a device that inputs information on the physical space 30 and information on the users. In the example illustrated in FIG. 1, the input unit 110 is provided above the physical space 30 in a state of being suspended from, for example, the ceiling. The input unit 110 may be an imaging device that targets the physical space 30 as an imaging target. In addition, as the input unit 110, for example, a camera that captures an image with one lens, or a stereo camera that can acquire information in the depth direction by capturing images with two lenses can be used.

The information processing system 100 can acquire information inside the physical space 30 by analyzing captured images captured by the imaging device. The information inside the physical space 30 includes information on the shape and arrangement of real objects such as walls, floors, and furniture in the physical space 30, and information on the users. In particular, when a stereo camera is used as the input unit 110, the information processing system 100 can acquire a map of distances from the input unit 110 (that is, depth information) by analyzing the captured images. Then, based on the depth information, the information processing system 100 compares the depth information of a real object with the depth information of a user's hand, for example, thereby being able to detect the user's hand touching or approaching the real object and the user's hand leaving the real object.

In the present embodiment, the position of an operation tool (for example, the user's hand) on the screen 21 is detected based on the images captured by the input unit 110, and various types of information are input based on the detected position of the operation tool. That is, the user can perform various operation inputs by moving the operation tool on the screen 21. For example, when a user's hand in contact with the screen 21 is detected, an operation input to the screen 21 is performed. In the following description, a case where a user's hand is used as an operation tool will be described as an example, but the present embodiment is not limited to this example, and various operation members such as a stylus may be used as the operation tool.

Here, the present embodiment is not limited to such an example, and the user's operation input may be executed by another method. For example, a touch panel may be provided on the wall 31 as the input unit 110, and a user operation input may be detected by contact of the user's fingers or the like on the touch panel. Furthermore, not only operations on the screen but also voice input or the like may be used.

The information processing system 100 can output information using an arbitrary location in the physical space 30 as the output location. For example, the information processing system 100 can project the screen 21 not only onto the wall 31 but also onto a wall 32, a wall 33, or a floor 34. For example, when what is called a moving projector is used as the output unit 160, the information processing system 100 provides the control of the output location by changing the projection direction of the moving projector. Alternatively, when a fixed projector is used as the output unit 160, the information processing system 100 selects one of four respective projectors that can project images onto the wall 31, the wall 32, the wall 33, and the floor 34, whereby control of the output location may be provided. The information processing system 100 can input information on an arbitrary location by making the input unit 110 in the same manner. The information processing system 100 can thus output information to an arbitrary location in the physical space 30, and can also detect a user input to a screen output to an arbitrary location.

The configuration of the information processing system 100 according to the present embodiment has been described above.

The user 11 illustrated in FIG. 1 is a user who serves as a notification source of information, and the user 12 is a user who serves as a notification destination of information. The users 11 and 12 can communicate with each other via the information processing system 100. For example, the user 11 inputs various types of information on a setting screen displayed by the information processing system 100, whereby setting information, including notification information to be issued to the user 12, a notification condition of the notification information, and the output location of the notification information, is set in the information processing system 100. The setting screen is a screen for setting or confirming the setting information. After that, the information processing system 100 outputs the set notification information to the set output location at a timing when the set notification condition is satisfied. As the notification information, for example, information in an arbitrary format, such as text, image, or voice, can be set. As the notification condition, for example, an arbitrary condition related to the position, action, or the like of the user 12 in the physical space can be set. As the output location, for example, an arbitrary location among the walls 31, 32, 33 and the floor 34 can be set. Therefore, user interaction with a high degree of freedom is provided, for example, a screen including a text message is output on the wall 31 at the timing when the user 12 enters the physical space 30.

In recent years, communication using text or voice has been actively performed using terminal devices such as smartphones. However, such a communication method has drawbacks in that it is difficult to instantly notice that information has come from the other party, information cannot be obtained at an appropriate timing, and a burden of carrying a terminal device is imposed. In this regard, the communication method using the physical space provided by the information processing system 100 can eliminate these drawbacks. This is because information is output to the physical space, so that the user does not have to carry any terminal device and can instantly notice the information. In addition, since the notification condition can be set freely, the user can obtain information at an appropriate timing.

In this context, it can be said that the concept itself of communication using a physical space is disclosed in Patent Literature 1. However, the technique disclosed in such literature has many limitations such as the location is limited to entrance, the notification condition is limited to the operation of the lighting switch, and the notification information is limited to images.

In this regard, the communication using the physical space provided by the information processing system 100 can reduce these limitations. This is because the notification information, the notification condition, and the output location can be set freely. For example, the information processing system 100 can output arbitrary notification information with an arbitrary location in the physical space serving as the output location at an arbitrary timing. Furthermore, the information processing system 100 can output notification information triggered by a fine movement in the physical space, which is difficult to detect with the GPS function of a smartphone, a tablet, or the like alone.

2. CONFIGURATION EXAMPLE

Figure 2:
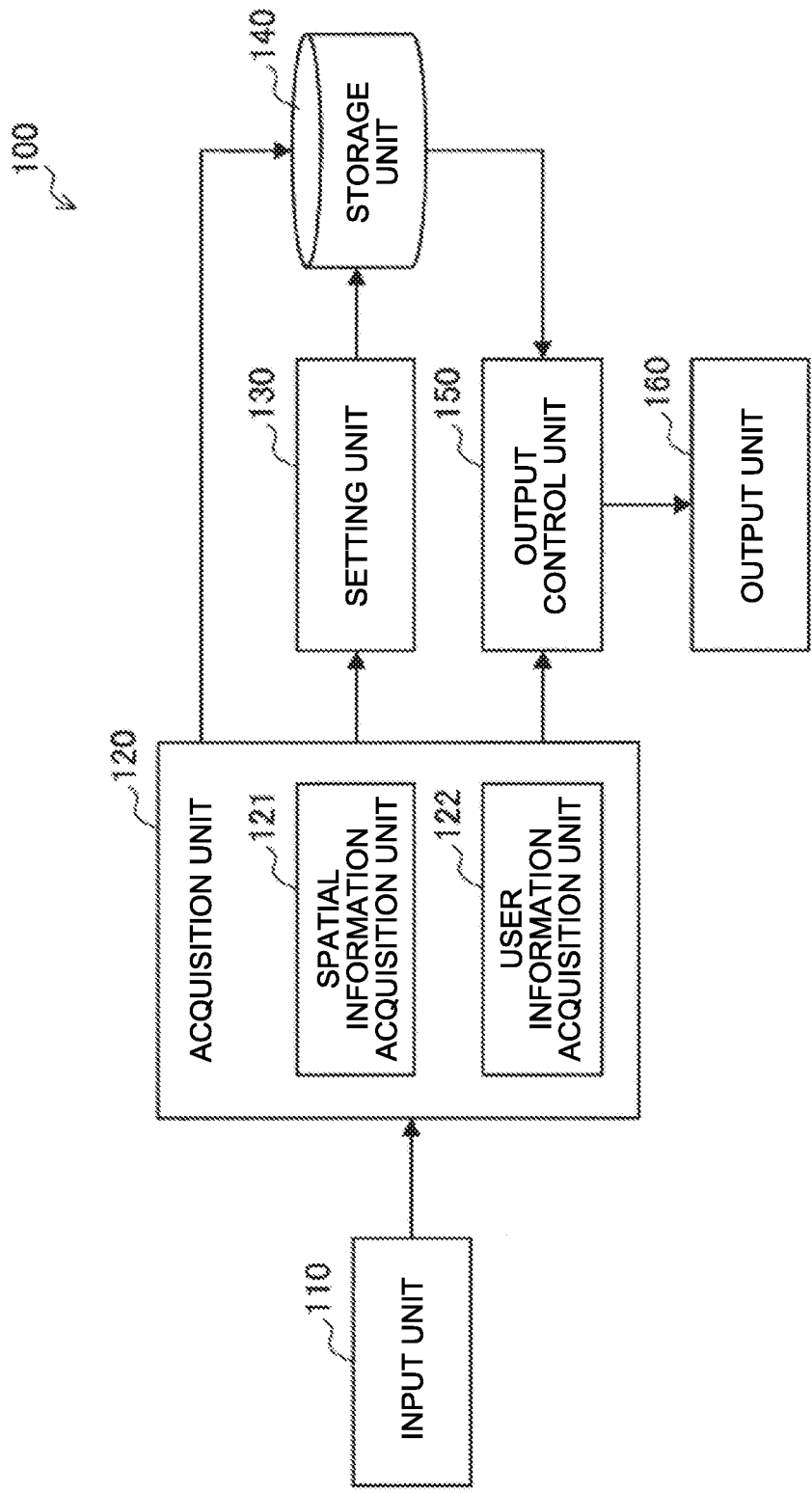
FIG. 2 is a block diagram illustrating an example of a configuration of the information processing system according to the present embodiment.

FIG. 2 is a block diagram illustrating an example of a configuration of the information processing system 100 according to the present embodiment. As illustrated in FIG. 2, the information processing system 100 includes the input unit 110, an acquisition unit 120, a setting unit 130, a storage unit 140, an output control unit 150, and the output unit 160. Note that the information processing system 100 may be implemented as a single device or may be implemented as a plurality of devices.

(1) Input Unit 110

The input unit 110 has a function of inputting information on users or the physical space. The input unit 110 can be implemented by various devices.

For example, the input unit 110 may include an imaging device. The imaging device includes a lens system, a drive system, and an imaging sensor, and captures images (still images or moving images).

For example, the input unit 110 may include a depth sensor. The depth sensor is a device that acquires depth information of an infrared distance measuring device, an ultrasonic distance measuring device, a time of flight (ToF) distance measuring device, a laser imaging detection and ranging (LiDAR), a stereo camera, or the like.

For example, the input unit 110 may include a sound collection device (microphone). The sound collection device is a device that collects surrounding sounds and outputs voice data converted into digital signals via an amplifier and an analog digital converter (ADC).

For example, the input unit 110 may include an inertial sensor. An inertial sensor is a device that detects inertial information such as acceleration or angular velocity. The inertial sensor is attached to a user, for example.

For example, the input unit 110 can be implemented as a biosensor. The biosensor is a device that detects biological information such as a user's heartbeat or body temperature. The biosensor is attached to a user, for example.

For example, the input unit 110 may include an environmental sensor. The environmental sensor is a device that detects environmental information such as lightness, temperature, humidity, or atmospheric pressure of the physical space.

For example, the input unit 110 may include a device that inputs information based on physical contact with a user. Examples of such a device include a mouse, a keyboard, a touch panel, a button, a switch, and a lever. These devices can be mounted on a terminal device such as a smartphone, a tablet terminal, or a personal computer (PC).

For example, the input unit 110 can be implemented as a wireless communication device. The wireless communication device conforms to wireless communication standards such as wireless local area network (LAN), Wi-Fi (registered trademark), Bluetooth (registered trademark), Zigbee (registered trademark), or near field communication (NFC), and is capable of communicating with other devices. For example, the wireless communication device reads a wireless identification tag such as a radio frequency identifier (RFID) tag.

The input unit 110 inputs information based on control by the acquisition unit 120. For example, the acquisition unit 120 can control the zoom rate and the imaging direction of the imaging device.

The input unit 110 may include one of or a combination of a plurality of the above-described input devices, or may include a plurality of input devices of the same type.

(2) Acquisition Unit 120

The acquisition unit 120 has a function of acquiring information in the physical space from the input information input using the input unit 110. As illustrated in FIG. 2, the acquisition unit 120 includes a spatial information acquisition unit 121 and a user information acquisition unit 122. The spatial information acquisition unit 121 has a function of acquiring information on the physical space (hereinafter also referred to as spatial information). The user information acquisition unit 122 has a function of acquiring user information (hereinafter also referred to as user information). Details of various types of information acquired by the acquisition unit 120 will be described later. The acquisition unit 120 outputs the acquired spatial information and user information to each of the setting unit 130, the storage unit 140, and the output control unit 150.

(3) Setting Unit 130

The setting unit 130 has a function of setting setting information, based on the spatial information and user information acquired by the acquisition unit 120. The setting information includes notification information from a first user to a second user, an output location of the notification information in the physical space, and a notification condition that is a condition for outputting the notification information. Details of the setting information set by the setting unit 130 and details of the setting process will be described later. The setting unit 130 outputs the set setting information to the storage unit 140.

(4) Storage Unit 140

The storage unit 140 has a function of temporarily or permanently storing information for the operation of the information processing system 100. The storage unit 140 stores the setting information set by the setting unit 130. The storage unit 140 stores the user information and spatial information acquired by the acquisition unit 120. The storage unit 140 constructs a database (DB) for storing these pieces of information.

(5) Output Control Unit 150

The output control unit 150 has a function of controlling the output unit 160 to output information, based on the spatial information and user information acquired by the acquisition unit 120 and the setting information output from the storage unit 140. Specifically, based on the setting information set by the setting unit 130, the output control unit 150 controls the output unit 160 to output the set notification information to the set output location when the notification condition set in the setting information is satisfied. Details of the output process by the output control unit 150 will be described later.

(6) Output Unit 160

The output unit 160 is a device that outputs information to the users. The output unit 160 can be implemented by various devices.

The output unit 160 may include a display device that outputs visual information. The output unit 160 maps and outputs the visual information onto the surface of a real object. An example of this output unit 160 is a projection device (that is, a projector). The projector may be, for example, a fixed wide-angle projector, or what is called a moving projector including a movable part that can change the projection direction, such as a Pan/Tilt drive type. In addition, examples of the output unit 160 capable of mapping and outputting visual information onto the surface of a real object include devices such as a head mounted display (HMD) having a transmissive display. In a device having a transmissive display, an augmented reality (AR) object is superimposed and displayed on the surface of a real object. In the present embodiment, the output unit 160 that outputs visual information will be described as a projector.

The output unit 160 may include a voice output device that outputs auditory information. Examples of this output unit 160 include a speaker, a directional speaker, an earphone, and a headphone.

The output unit 160 may include a tactile output device that outputs tactile information. Examples of the tactile information include vibration, force sense, temperature, or electrical stimulation. Examples of the output unit 160 that outputs tactile information include a motor, an actuator, and a heat source.

The output unit 160 may include a device that outputs olfactory information. Examples of the olfactory information includes a scent. Examples of the output unit 160 that outputs olfactory information include an aroma diffuser.

The output unit 160 outputs information based on the control by the output control unit 150. For example, the output unit 160 can change the projection direction of the moving projector or the directivity of the directional speaker, based on the control by the output control unit 150.

The output unit 160 may include one of or a combination of a plurality of the above-described output devices, or may include a plurality of output devices of the same type.

In particular, in the present embodiment, it is desirable that a plurality of output devices of the same type be installed in the physical space with different installation locations or output directions. This is because it is possible to output the notification information using an arbitrary location in the physical space as the output location.

3. TECHNICAL FEATURES

Hereinafter, technical features of the information processing system 100 will be described in detail.

<3.1. Contents of Various Types of Information>

(1) Spatial Information

The spatial information acquisition unit 121 acquires spatial information based on the information input by the input unit 110. Hereinafter, the spatial information will be described.

The spatial information may include information indicating the type and arrangement of real objects in the physical space. Furthermore, the spatial information may include identification information of real objects. For example, the spatial information acquisition unit 121 acquires these pieces of information by recognizing captured images. Alternatively, the spatial information acquisition unit 121 may acquire these pieces of information, based on reading results from an RFID tag attached to a real object in the physical space. Furthermore, the spatial information acquisition unit 121 may acquire these pieces of information based on user input. Examples of the real objects in the physical space include walls, floors, and furniture.

The spatial information can include three-dimensional information indicating the shape of the space. The three-dimensional information indicating the shape of the space is information indicating the shape of the space defined by a real object in the physical space. For example, the spatial information acquisition unit 121 acquires three-dimensional information indicating the shape of the space, based on the depth information. When the information indicating the type and arrangement of a real object in the physical space and the identification information of the real object are acquirable, the spatial information acquisition unit 121 may take into account these pieces of information and acquire the three-dimensional information indicating the shape of the space.

The spatial information may include information such as the material, color, or texture of the surfaces forming the space (for example, the surfaces of real objects such as walls, floors, and furniture). For example, the spatial information acquisition unit 121 acquires these pieces of information by recognizing captured images. When the information indicating the type and arrangement of a real object in the physical space and the identification information of the real object are acquirable, the spatial information acquisition unit 121 may take into account these pieces of information and acquire these pieces of information.

The spatial information may also include information regarding the state in the physical space, such as the brightness, temperature, and humidity of the physical space. For example, the spatial information acquisition unit 121 acquires these pieces of information, based on the environment information.

The spatial information includes at least one type of the information described above.

(2) User Information

The user information acquisition unit 122 acquires user information based on the information input by the input unit 110. Hereinafter, the user information will be described.

The user information may include whether a user exists in the physical space, the number of users existing in the physical space, and identification information of each user. For example, the user information acquisition unit 122 acquires these pieces of information by recognizing the face portion of the user included in captured images.

The user information may include user attribute information. The attribute information is information indicating user attributes such as age, sex, work, family structure, or friendship. For example, the user information acquisition unit 122 acquires user attribute information, based on captured images or by making an inquiry to a database storing the attribute information using the user identification information.

The user information may include information indicating the position of the user. For example, the user information acquisition unit 122 acquires information indicating the position of the user, based on captured images and the depth information.

The user information may include information indicating the posture of the user. For example, the user information acquisition unit 122 acquires information indicating the posture of the user, based on captured images, the depth information, and the inertia information. The posture of the user may refer to the posture of the whole body such as pausing, standing, sitting, or lying down, or the posture of a partial body such as face, torso, hand, foot, or fingers.

The user information may include information indicating the user's action. For example, the user information acquisition unit 122 may recognize the user's action in an arbitrary method, such as an optical method using an imaging device or both an imaging device and a marker, an inertial sensor method using an inertial sensor attached to the user, or a method using the depth information, thereby acquiring the information indicating the user's action. The user's action may refer to an action using the whole body such as movement, or an action using a part of the body such as a hand gesture. In addition, as the user information, a user input on a screen mapped and displayed on an arbitrary surface of the physical space as described above with reference to FIG. 1 is also acquired as the information indicating the user's action.

The user information may include information input by the user by voice. For example, the user information acquisition unit 122 can acquire such information by recognizing the speech of the user.

The user information includes at least one type of the information described above.

(3) Setting Information

The setting unit 130 has a function of setting information including notification information from the first user to the second user, the output location of the notification information in the physical space, and a notification condition that is a condition for outputting the notification information. Hereinafter, the setting information will be described in detail.

Notification Information

The notification information includes information in an arbitrary format that can be output by the output unit 160.

The notification information may include visual information. Examples of the visual information include text and images (still images/moving images).

The notification information may include auditory information. Examples of the auditory information include audio.

In addition, the notification information may include tactile information such as vibration, force sense, temperature, or electrical stimulation, or olfactory information such as scent.

The notification information may include a combination of a plurality of types of information. For example, the notification information may include a combination of text, image, and voice.

Output Location

The output location is set as an absolute location in the physical space or as a relative location with respect to the second user.

The absolute location in the physical space is, for example, a specific wall surface or a specific furniture surface. The setting unit 130 sets an absolute location in the physical space as the output location by specifying the coordinates corresponding to a specific location in the three-dimensional information of the physical space.

The relative location with respect to the second user is, for example, the surface to which the second user's line of sight is directed, the floor on the movement path of the second user, or the body surface of the second user. The setting unit 130 sets a relative location with respect to the second user as the output location by specifying relative coordinates with respect to the position and/or posture of the second user. In this case, it is possible to output the notification information to a location where the second user can easily notice regardless of the position, posture, or action of the second user in the physical space.

Notification Condition

The notification condition includes information for specifying the second user, and includes a condition regarding at least one of the position, posture, or action of the second user in the physical space, the state of the physical space, or time.

The information for specifying the second user is information for specifying the user who serves as the notification destination of the notification information. Such information includes user identification information. In this case, the user specified by the identification information can be statically the second user. Alternatively, the information specifying the second user may be information specifying the user's attribute or state. In this case, among users in the physical space, an arbitrary user who is, for example, male or tired can be dynamically set as the second user. Furthermore, information for specifying all users may be set as the information for specifying the second user. In this case, an unspecified user can be the notification destination of the notification information.

The notification condition regarding the position, posture, or action of the second user in the physical space refers to a condition indicating the second user being at a predetermined position in the physical space, taking a predetermined posture, performing a predetermined action, or the like. Under this condition, for example, the notification information is issued at an arbitrary timing such as the timing at which the second user is passing through a specific location such as a corridor or entrance, bending to wear shoes, or touching a specific real object.

The notification condition regarding the state of the physical space refers to a state of the physical space, such as the temperature, the lightness, or the arrangement of a real object in the physical space, becoming a predetermined state. Under this condition, for example, the notification information is issued at an arbitrary timing such as the timing at which the temperature of the physical space is remarkably lowered or a light of the physical space is turned off.

The notification condition regarding time refers to a condition indicating a predetermined time having been reached, a predetermined time having passed, or the like. Under this condition, for example, the notification information is issued at an arbitrary timing such as the timing at which the wake-up time is reached.

These conditions may be set in combination. For example, by combining the position of the second user and time, it is possible to set a notification condition such that the notification information is issued after a predetermined time has elapsed since the second user touched a specific real object.

Thus, the first user can set the timing at which the notification information is issued to the second user with a high degree of freedom.

Typically, the first user and the second user are different persons. In this case, it is possible to perform communication between different users. For example, as the relationship between the first user and the second user, a relationship such as a parent and a child, an elder brother and a younger brother, or friends is assumed. Furthermore, each of the first user and the second user may be one person, or each of them may be a plurality of persons, or one of them may be one person and the other may be a plurality of persons.

The first user and the second user may be the same person. In this case, the user can set to notify himself/herself of information. Information to be issued to itself includes a schedule for the next day, the setting of an alarm time, a checklist for things left before going out, and the like. The user can recognize these pieces of information, which are conventionally managed on a notebook or a terminal device such as a smartphone, without opening the notebook or operating the terminal device. It is therefore possible to prevent the user from failing to confirm information. Moreover, the user can reduce the trouble of leaving a memo by handwriting or making a recording in a terminal device.

<3.2. Setting Information Setting Process>

The setting information setting process will be described in detail below.

Setting Made by the First User

The setting information may be set by the first user.

For example, the acquisition unit 120 sets the setting information based on a user input on the setting screen.

The setting screen may be mapped and displayed on an arbitrary surface of the physical space. For example, the setting unit 130 sets the setting information based on the action of the first user with respect to the setting screen projected onto the physical space by a projector. Hereinafter, an example of this will be described with reference to FIGS. 3 and 4.

Figure 3:
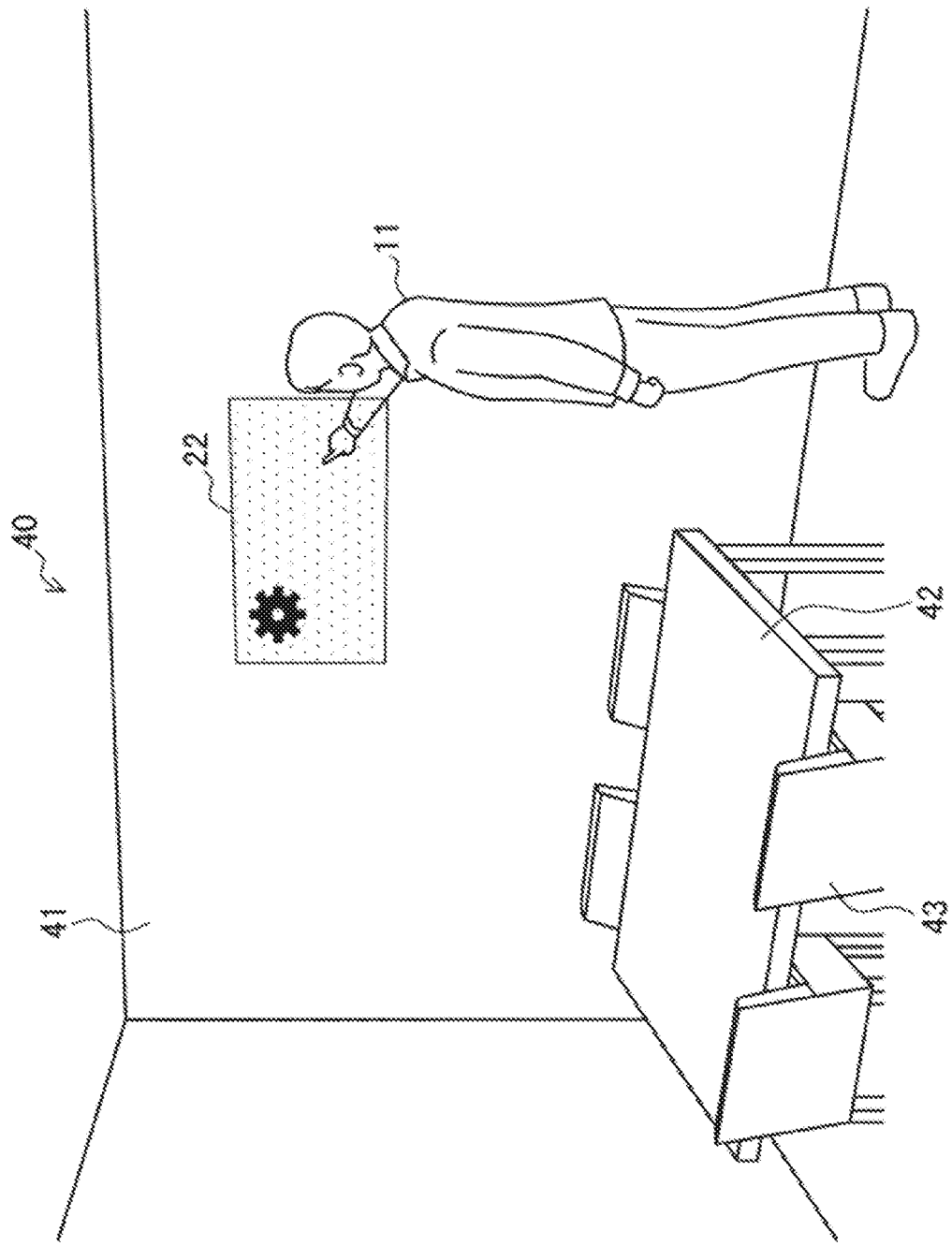
FIG. 3 is a diagram for explaining an example of a UI provided by the information processing system according to the present embodiment.
Figure 4:
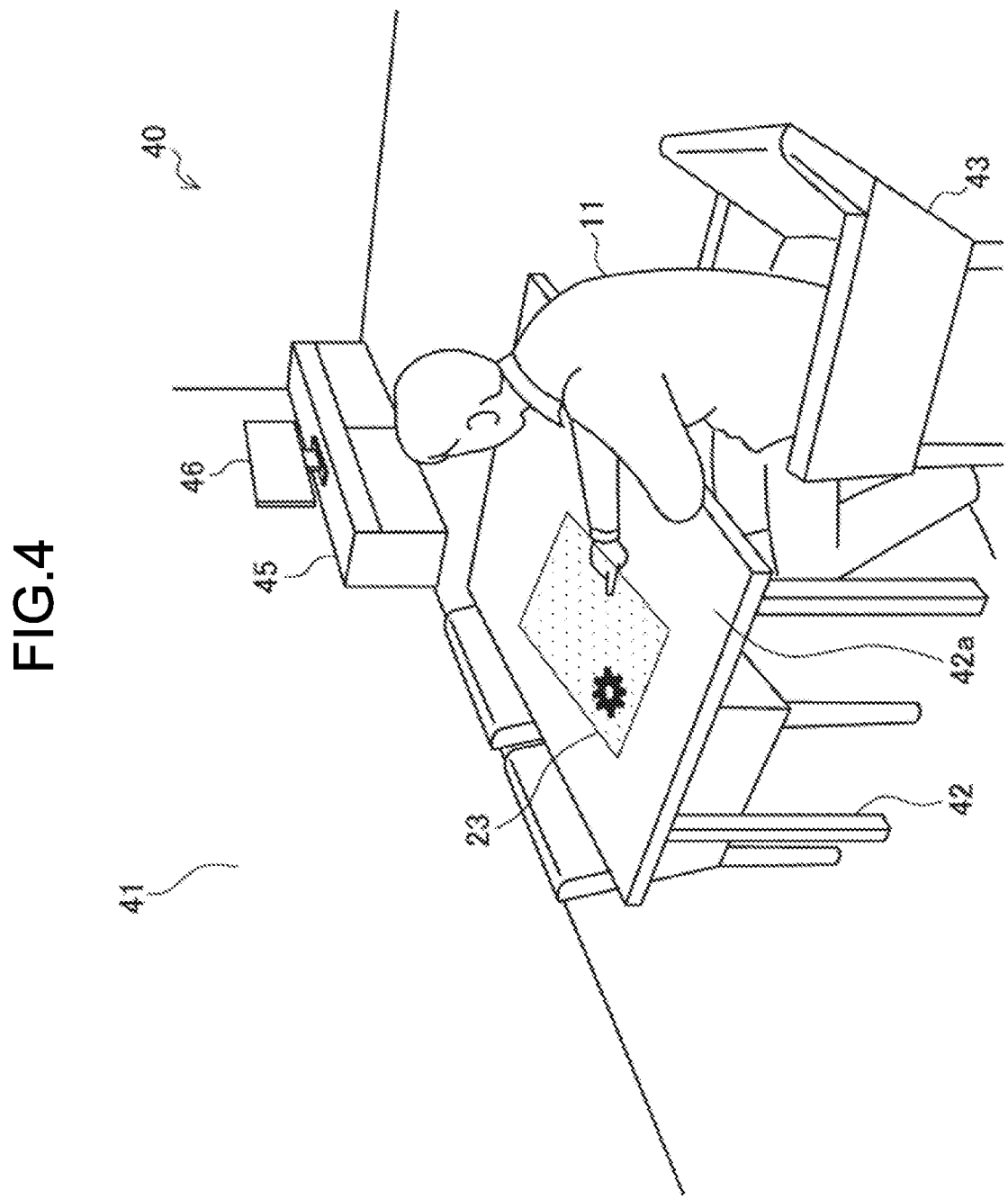
FIG. 4 is a diagram for explaining an example of a UI provided by the information processing system according to the present embodiment.

FIGS. 3 and 4 are diagrams for explaining examples of a user interface (UI) provided by the information processing system 100 according to the present embodiment. A physical space 40 illustrated in FIGS. 3 and 4 is surrounded by a wall 41, and includes a table 42, four chairs 43, a low board 45, and a television receiver (hereinafter also referred to as TV) 46 on the low board 45. In the example illustrated in FIG. 3, a setting screen 22 is mapped and displayed (for example, projected) onto the wall 41. The first user 11 inputs setting information by touching the setting screen 22. In the example illustrated in FIG. 4, the setting screen 23 is mapped and displayed (for example, projected) onto a top surface 42a of the table 42. The first user 11 inputs setting information by touching the setting screen 23. In the examples described with reference to FIG. 3 and FIG. 4, the first user 11 can set the setting information by inputting information with a finger on a screen mapped and displayed in the physical space 40. Therefore, the first user 11 can omit the trouble of installing or operating a dedicated application on a terminal device such as a smartphone.

Here, the display of the setting screen is started based on the user information of the first user. For example, the setting screen is displayed by mapping it onto a real object in the direction in which the first user points a finger, a real object touched, or a real object specified by voice. Here, a predetermined condition may be set in order to determine whether the action of the first user is an action intended to display the setting screen. Examples of the predetermined condition include keeping touching the same location for a few seconds or speaking a specific secret word. Under such a condition, it is possible to prevent the setting screen from being displayed unintentionally.

The setting screen may be displayed on a terminal device such as a smartphone. In this case, the setting unit 130 sets the setting information based on an input made by the first user to the setting screen displayed on the terminal device. In this case, the first user can set the setting information from a remote place.

Note that the setting unit 130 may set the setting information based on a voice input made by the first user in the physical space, other than the input to the setting screen.

Setting of Output Location

The setting unit 130 may set the setting information with a location specified by the first user in the physical space as the output location. For example, setting information is set with a real object in the direction in which the first user points a finger, a real object touched, or a real object specified by voice in the physical space, serving as the output location. The first user can thus intuitively set the output location.

The setting unit 130 may set setting information with the location specified by the first user on a setting screen including an overhead view of the physical space, serving as the output location. The setting unit 130 generates the setting screen including an overhead view of the physical space, based on information indicating the type and arrangement of a real object in the physical space and spatial information such as three-dimensional information of the physical space. The overhead view is typically a floor plan. The setting unit 130 sets setting information with the location specified by the first user on the setting screen, serving as the output location. The first user can thus set the output location while looking down at the physical space.

The setting screen including an overhead view of the physical space may be displayed by a terminal device. In this case, the output location is set based on an input made by the first user to the terminal device. Specifically, the setting unit 130 sets setting information with the location in the physical space corresponding to the location specified by the first user in the overhead view, serving as the output location. The first user can set the output location while looking down at the physical space from a remote place. Hereinafter, as an example, a UI for setting the output location using a terminal device will be described with reference to FIG. 5.

Figure 5:
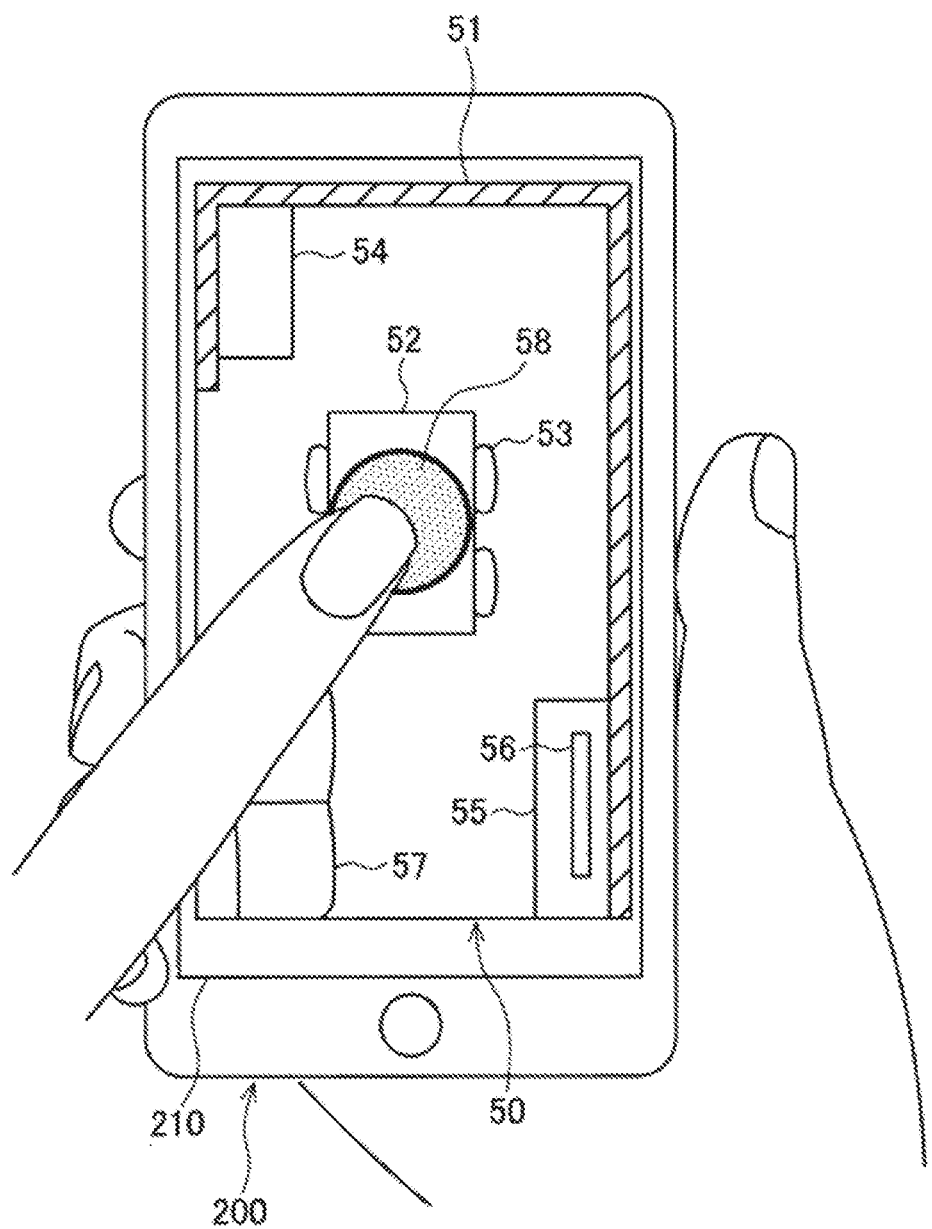
FIG. 5 is a diagram for explaining an example of a UI provided by the information processing system according to the present embodiment.

FIG. 5 is a diagram for explaining an example of a UI provided by the information processing system 100 according to the present embodiment. As illustrated in FIG. 5, a setting screen 50 including an overhead view of the physical space 40 is displayed on a display 210 of a smartphone 200. The setting screen 50 includes an overhead view in which a wall 51, a table 52, four chairs 53 arranged around the table 52, a cabinet 54, a low board 55, a TV 56 arranged on the low board 55, and a sofa 57 are arranged. The overhead view is an overhead view of the physical space 40 illustrated in FIGS. 3 and 4. Specifically, the wall 41 corresponds to the wall 51, the table 42 corresponds to the table 52, the chairs 43 corresponds to the chairs 53, the low board 45 corresponds to the low board 55, and the TV 46 corresponds to the TV 56. The user can specify an output location on the setting screen 50. In the example illustrated in FIG. 5, the top surface of the table 52 is specified as the output location, and information 58 indicating that the output location is specified is displayed. In this case, the notification information is displayed on a top surface 42a of the table 42 illustrated in FIGS. 3 and 4.

Setting of Notification Information and Notification Condition

The setting unit 130 sets the notification information and notification condition, based on an instruction from the first user. For example, the setting unit 130 displays a setting screen for setting the notification information and notification condition, and sets the notification information and notification condition, based on a user operation on the setting screen. Hereinafter, an example of a setting screen for setting the notification information and notification condition will be described with reference to FIG. 6.

Figure 6:
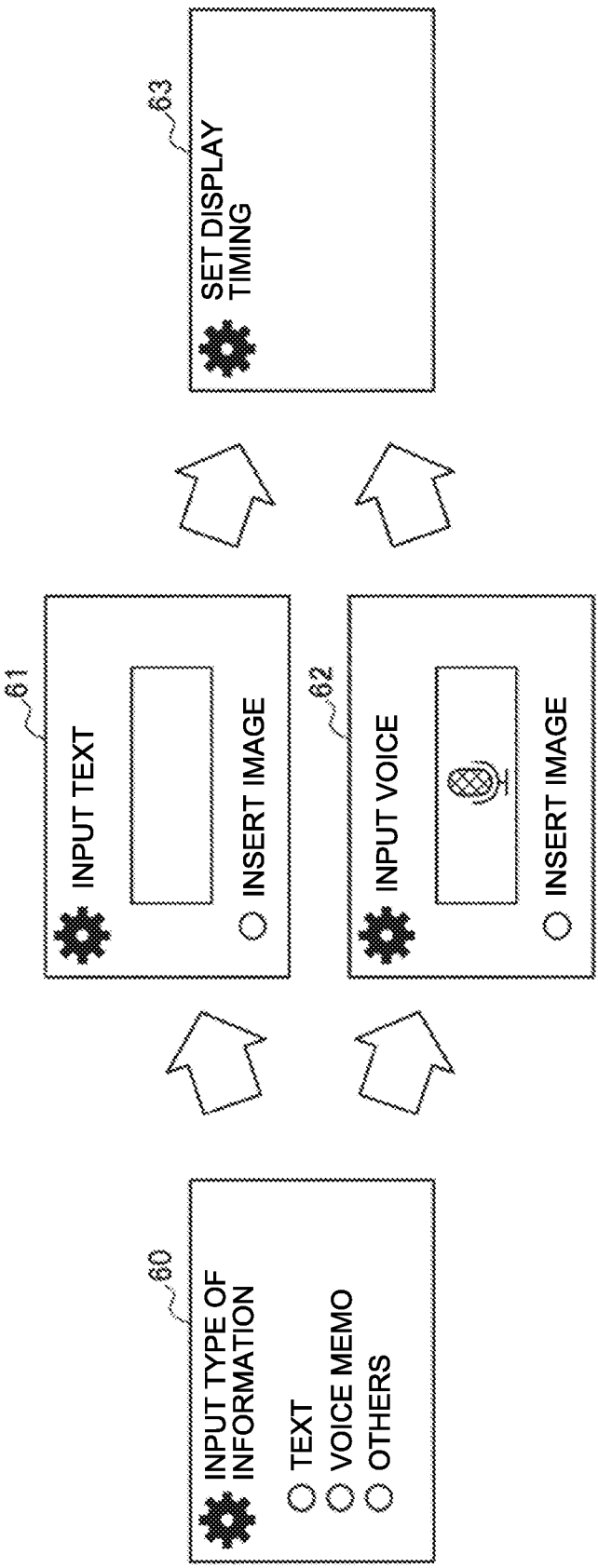
FIG. 6 is a diagram for explaining an example of transition of a UI provided by the information processing system according to the present embodiment.

FIG. 6 is a diagram for explaining an example of transition of a UI provided by the information processing system 100 according to the present embodiment. As illustrated in FIG. 6, first, a setting screen 60 for inputting the type of information is displayed. When the first user selects text on the setting screen 60, a setting screen 61 for entering a text is displayed. On the setting screen 61, a text can be input and an image displayed together with the text can also be set. When the first user selects a voice memo on the setting screen 60, a setting screen 62 for inputting voice is displayed. When the first user utters voice while the setting screen 62 is displayed, the voice is set as the notification information. On the setting screen 62, a voice input can be made, and an image displayed together with a voice output can also be set. When the setting on the setting screen 61 or the setting screen 62 is completed, a setting screen 63 for setting a display timing (that is, a notification condition) is displayed. On the setting screen 63, the first user sets the notification condition.

Here, the location for which the notification condition is determined may be set in the same manner as the output location described above. The location for which the notification condition is determined is a location for which whether to satisfy the notification condition is determined. For example, when the notification condition is the second user's moving to a specific location, the specific location is the location for which the notification condition is determined. Note that the output location, the location for which the notification condition is determined, and the location where the setting screen is displayed may be different, or two or more locations of these may be the same.

For example, the setting unit 130 may set the setting information with the location specified by the first user in the physical space, serving as the location for which the notification condition is determined. Furthermore, the setting unit 130 may set the setting information with the location specified by the first user on the setting screen including an overhead view of the physical space, serving as the location for which the notification condition is determined.

Output of Information Indicating Setting Information that has been Set

The output control unit 150 may control the output unit 160 to output information indicating the setting information that has been set. Specifically, the output control unit 150 controls the output unit 160 to output information indicating at least one of the notification information, the output location, and the notification condition included in the setting information that has been set. The first user can thus confirm what setting information has been set. In addition, the second user can recognize what kind of notification information can be received at which location and under what condition, and can actively take an action that satisfies the notification condition.

Information indicating the setting information that has been set may be mapped and displayed onto the output location set in the setting information. The user can thus intuitively recognize where in the physical space the notification information is output.

Information indicating the setting information that has been set may be included and displayed on a setting screen including an overhead view. For example, on this setting screen including an overhead view, information indicating the setting information that has been set is arranged at a location corresponding to the set output location. This UI example will be described with reference to FIG. 7.

Figure 7:
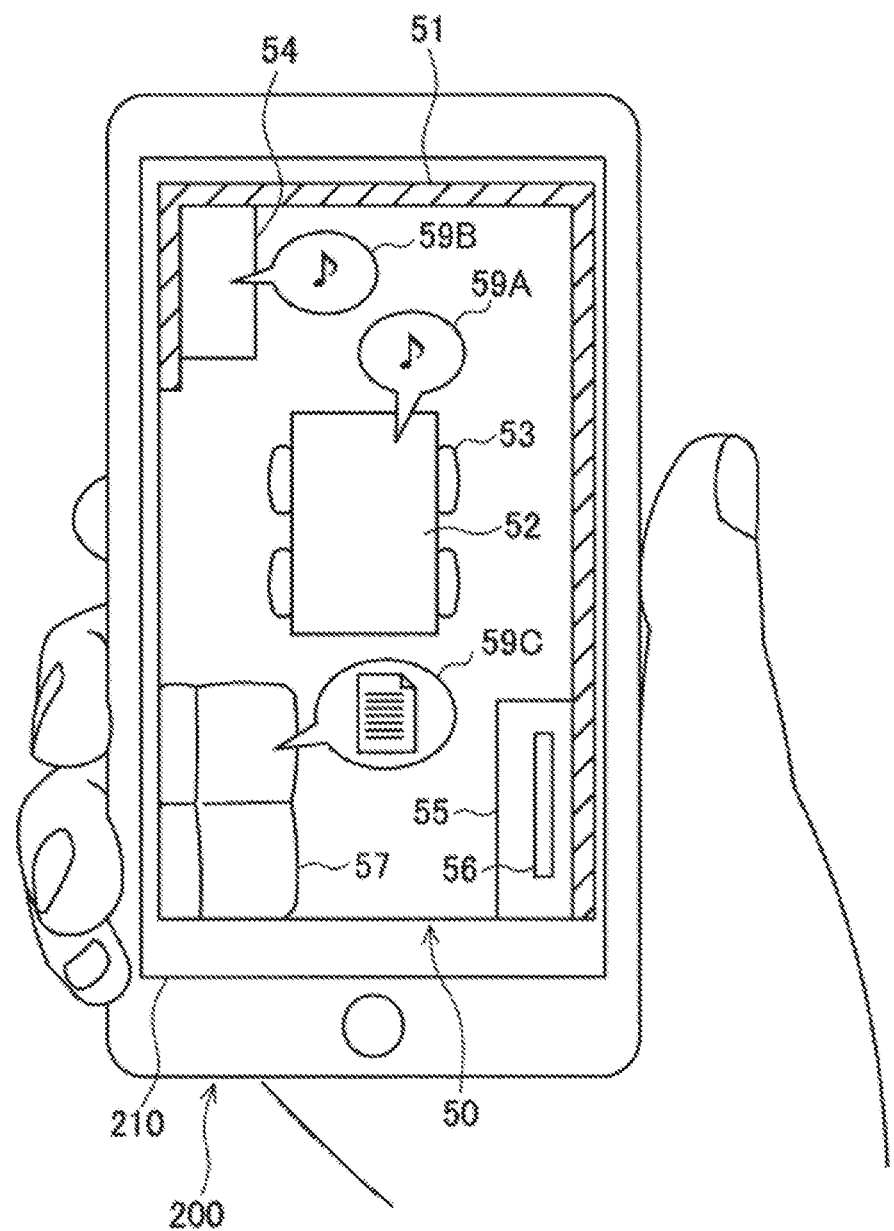
FIG. 7 is a diagram for explaining an example of a UI provided by the information processing system according to the present embodiment.

FIG. 7 is a diagram for explaining an example of a UI provided by the information processing system 100 according to the present embodiment. As illustrated in FIG. 7, the setting screen 50 including an overhead view of the physical space 40 is displayed on the display 210 of the smartphone 200. The user can set setting information on the setting screen 50. On the setting screen 50, indicators 59A to 59C indicating setting information that has been set are arranged. The music note included in the indicator 59A indicates that the notification information includes voice. The fact that the indicator 59A is arranged in association with the table 52 indicates that the table in the physical space is set as the output location. The music note included in the indicator 59B indicates that the notification information includes voice. The fact that the indicator 59B is arranged in association with the cabinet 54 indicates that the cabinet in the physical space is set as the output location. The document symbol included in the indicator 59C indicates that the notification information includes text. The fact that the indicator 59C is arranged in association with the sofa 57 indicates that the sofa in the physical space is set as the output location. With this setting screen, the user can confirm at a glance what setting information is set with what location serving as the output location. This particularly improves user convenience when a large amount of setting information is set.

While the output location has been described in the above description, a similar UI can be provided for the location for which the notification condition is determined. In other words, the information indicating the setting information that has been set may be mapped and displayed onto the location for which the notification condition is determined set in the setting information. The user can thus intuitively recognize in which location in the physical space the notification condition is determined. Furthermore, on the setting screen including an overhead view, information indicating the notification information set in the setting information that has been set may be arranged at a location corresponding to the set location for which the notification condition is determined. With such a setting screen, the user can confirm at a glance where in the physical space the notification condition is determined.

Automatic Setting

The setting unit 130 may set the setting information without any input made by the first user. For example, the setting unit 130 may set at least one of the notification information, the notification condition, and the output location without any input made by the first user.

The setting unit 130 may set setting information including notification information corresponding to the output location. For example, the setting unit 130 sets weather or road information as the notification information with the entrance serving as the output location, sets earthquake early warning as the notification information with the living room serving as the output location, and sets information for prompting the user to extinguish the kitchen fire as the notification information with the corridor following the entrance serving as the output location. The load in setting the setting information on the first user is thus reduced.

Process Flow

Next, an example of a flow of a setting information setting process will be described with reference to FIG. 8.

Figure 8:
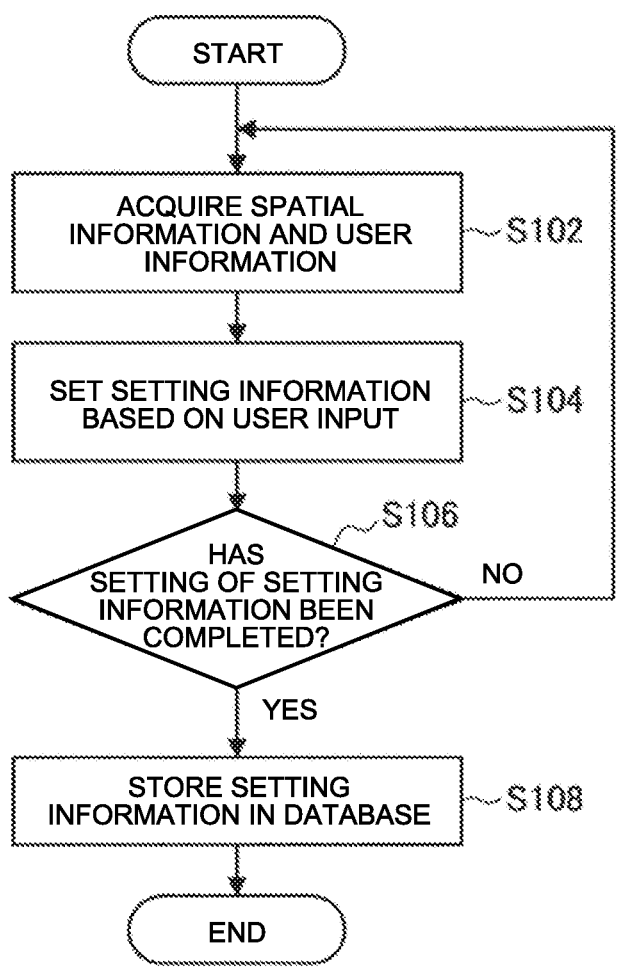
FIG. 8 is a flowchart illustrating an example of a flow of a setting information setting process executed by the information processing system according to the present embodiment.

FIG. 8 is a flowchart illustrating an example of the flow of the setting information setting process executed by the information processing system 100 according to the present embodiment.

As illustrated in FIG. 8, the acquisition unit 120 first acquires the spatial information and user information (Step S102). Specifically, the spatial information acquisition unit 121 acquires the spatial information based on the input information input using the input unit 110. Furthermore, the user information acquisition unit 122 acquires the user information of the first user based on the input information input using the input unit 110. These pieces of information are stored in the storage unit 140.

Next, the setting unit 130 sets setting information based on a user input (Step S104). For example, the setting unit 130 sets the setting information based on a user input to a setting screen mapped and displayed onto an arbitrary surface of the physical space or a setting screen displayed on a terminal device.

Next, the setting unit 130 determines whether the setting of the setting information has been completed (Step S106). If it is determined that the setting has not been completed (Step S106/NO), the process returns to Step S102 again. When it is determined that the setting has been completed (Step S106/YES), the storage unit 140 stores the setting information in the DB (Step S108).

Through the process described above, the spatial information, user information, and setting information stored in the storage unit 140 are updated to the latest.

<3.3. Notification Information Output Process>

A notification information output process will be described in detail below.

Based on the setting information set by the setting unit 130, the output control unit 150 controls the output unit 160 to output the set notification information to the set output location when the notification condition set in the setting information is satisfied. Specifically, first, the output control unit 150 refers to the storage unit 140, reads one or more pieces of setting information that have been set, and determines whether the notification condition is satisfied for each of them. The output control unit 150 determines whether the notification condition is satisfied based on at least one of the user information of the second user and the spatial information. Then, when the notification condition is satisfied, the output control unit 150 controls the output unit 160 to output the set notification information to the output location set in the setting information that satisfies the notification condition. One example of this will be described with reference to FIG. 9.

Figure 9:
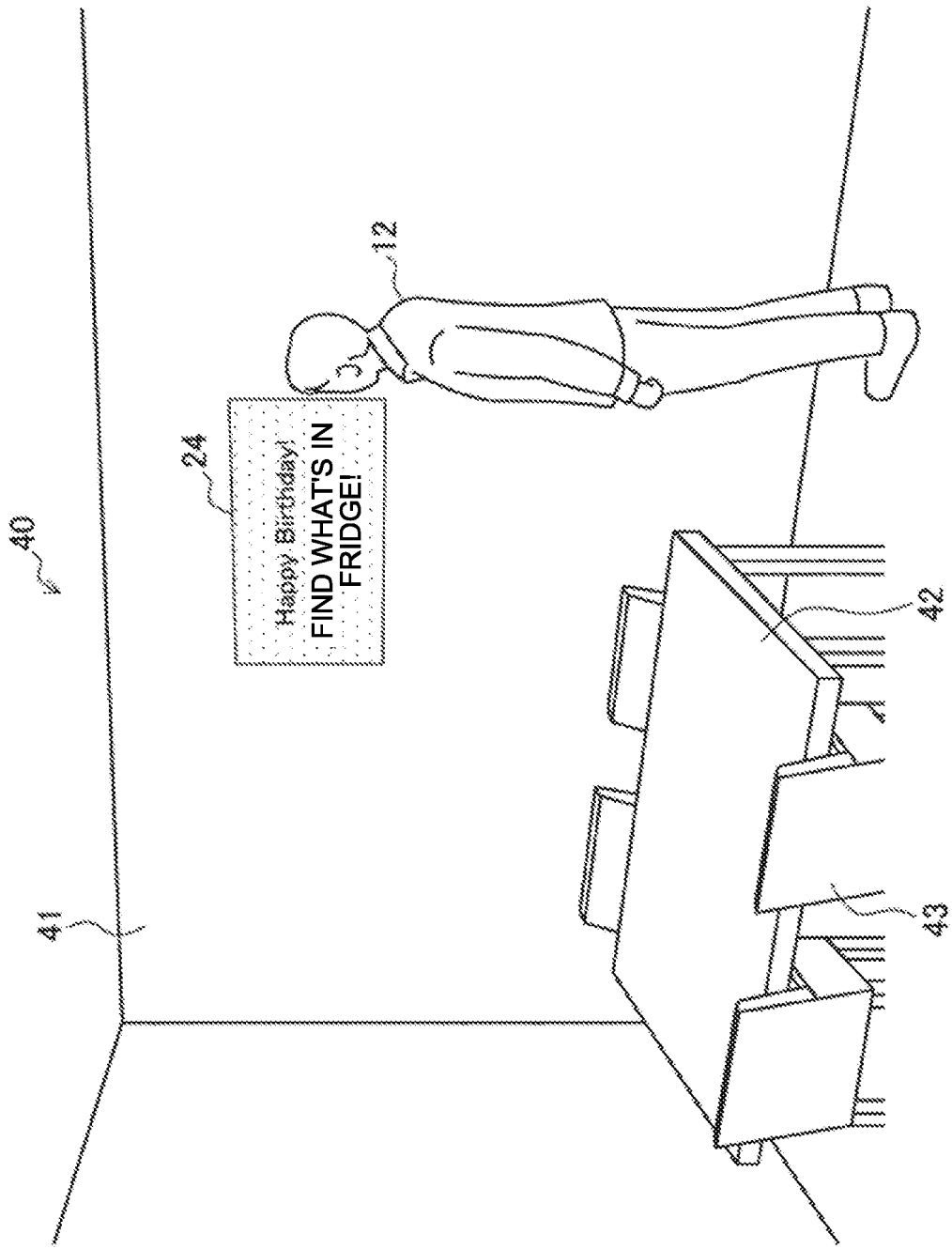
FIG. 9 is a diagram for explaining an example of a UI provided by the information processing system according to the present embodiment.

FIG. 9 is a diagram for explaining an example of a UI provided by the information processing system 100 according to the present embodiment. The physical space 40 illustrated in FIG. 9 is the same as the physical space 40 described with reference to FIGS. 3 to 5. For example, it is assumed that the first user 11 sets the setting information such that the notification information is output to the wall 41 at the timing when the second user 12 has come close to the table 42 in the physical space 40. In this case, as illustrated in FIG. 9, a screen 24 including the set notification information is displayed on the wall 41 at the timing when the second user 12 has come close to the table 42 in the physical space 40.

The control of the output location can be provided, for example, by selecting an output device that outputs notification information from among a plurality of output devices having different installation locations or output directions. For example, the control of the output location is provided by selecting a projector that outputs notification information from among a plurality of fixed projectors having different projection directions.

Control of the output location can be performed by controlling the output device to change the output location. For example, the control of the output location related to visual information can be provided by, for example, driving a moving projector to change projection directions. Control of the output location related to auditory information can be provided, for example, by changing the directivity of a directional speaker, using an ultrasonic speaker, or using a wavefront synthesis technique.

Change in Content of Notification Information

The output control unit 150 may change the content of the notification information, based on at least one of the user information of the second user and the spatial information. The output control unit 150 can change the content of the notification information according to the user attribute or state. For example, the output control unit 150 translates the text included in the notification information into the native language of the second user when the second user is a foreigner, and changes the text included in the notification information to something understandable to children when the second user is a child. Furthermore, the output control unit 150 can change the content of the notification information in accordance with a real object onto which the notification information is mapped and displayed. For example, the output control unit 150 simplifies the notification information when the area where the notification information is mapped and displayed is small and a sufficient display area cannot be secured. By changing the content of the notification information as described above, the second user can recognize the notification information more comfortably.

The output control unit 150 may update the content of the notification information to the information at the time of output. For example, the output control unit 150 accesses the Web or the like and updates the content of the notification information to the latest information. This makes it possible to provide the latest information to the second user regarding information that changes according to time, such as weather or road information.

Selection of Output Modal

The output control unit 150 may select the type of the output device that outputs the notification information, based on at least one of the user information of the second user and the spatial information. For example, when the second user is an adult, the output control unit 150 selects a display device as the output device in order to output the text included in the notification information as a character string. When the second user is a child, the output control unit 150 selects a voice output device as the output device in order to output the text included in the notification information by voice. In addition, for example, when the noise level in the physical space is too high to recognize the voice, the output control unit 150 selects a display device as the output device in order to convert the voice included in the notification information into a text and output it as a character string. When the noise level in the physical space is low, the output control unit 150 selects a voice output device as the output device in order to output the voice included in the notification information as it is. By selecting the output device in this manner, the second user can recognize the notification information more comfortably.

Confirmation Before Notification

The output control unit 150 may control the output unit 160 to output the notification information when the notification condition is satisfied and the second user agrees to output the notification information. For example, when the notification condition is satisfied, the output control unit 150 controls the output unit 160 to output a screen or voice guidance asking whether to agree to output the notification information. The output control unit 150 causes the notification information to be output when consent is obtained, and does not cause the notification information to be output when consent is not obtained. The second user can thus actively and selectively receive issuance of the notification information.

Feedback

The output control unit 150 may control the output unit 160 to output information indicating the reaction of the second user to the output notification information, to the first user. The information indicating the reaction of the second user is whether a notification of information has been received, a reply to the issued information, and the like. The setting unit 130 may set the setting information using the information indicating the reaction of the second user as notification information for the first user. Accordingly, the information indicating the reaction of the second user is output to the first user at the timing when the first user has come back to the physical space or the like. With this, not only one-way communication from the first user to the second user but also two-way communication is achieved.

Others

The storage unit 140 may delete or leave the setting information for which the notification information has been output. Furthermore, the storage unit 140 may delete the setting information when the output count of the notification information has reached a predetermined threshold, or may delete the setting information when a predetermined period has elapsed.

Process Flow

Next, an example of a flow of a notification information output process will be described with reference to FIG. 10.

Figure 10:
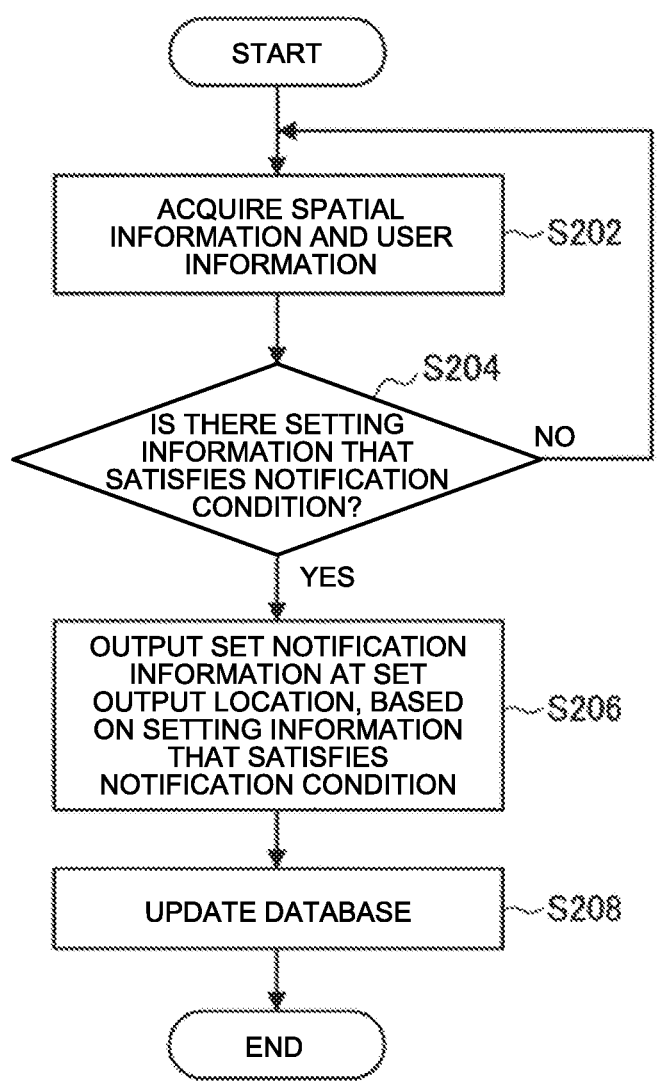
FIG. 10 is a flowchart illustrating an example of a flow of a notification information output process executed by the information processing system according to the present embodiment.

FIG. 10 is a flowchart illustrating an example of a flow of a notification information output process executed by the information processing system 100 according to the present embodiment.

As illustrated in FIG. 10, the acquisition unit 120 first acquires the spatial information and user information (Step S202). Specifically, the spatial information acquisition unit 121 acquires the spatial information based on the input information input using the input unit 110. Furthermore, the user information acquisition unit 122 acquires the user information of the second user based on the input information input using the input unit 110. These pieces of information are stored in the storage unit 140.

Next, the output control unit 150 determines whether there is setting information that satisfies the notification condition (Step S204). Specifically, the output control unit 150 reads one or more pieces of setting information stored in the storage unit 140, and determines whether each piece satisfies the notification condition, based on at least one of the spatial information and the user information. If it is determined that there is no setting information that satisfies the notification condition (Step S204/NO), the process returns to Step S202 again.

If it is determined that there is setting information that satisfies the notification condition (Step S204/YES), the output control unit 150 outputs the set notification information at the set output location, based on the setting information that satisfies the notification condition (Step S206). In this process, the output control unit 150 may change the content of the notification information, select an output modal, and/or perform confirmation before notification or the like. Furthermore, after the notification information is output, the output control unit 150 may perform feedback to the first user.

Next, the storage unit 140 updates the setting information DB (Step S208). For example, the storage unit 140 deletes the setting information for which the notification information has been output.

4. APPLICATION EXAMPLES

Hereinafter, application examples of the information processing system 100 will be described.

(1) Application Example for Improving Convenience in Daily Life

For example, the information processing system 100 reproduces the voice "Take out the garbage" when the second user sits in the sofa. As described above, the first user can prompt the second user to perform an action that he/she wants to perform in daily life. In addition, the information processing system 100 displays a list of belongings at the time of going out, on a position where it is easy to notice (such as a door) at a location where the second user always stops when going out (such as the entrance) at the timing when the second user has moved to the location. This prevents the second user from leaving something necessary behind when going out.

(2) Application Example for Preventing Dangerous Behavior

For example, the information processing system 100 outputs, in voice or text, a warning that a child should not come close when a child approaches a dangerous location, such as a kitchen, at the timing when the child has come close. This can guide a child to another direction and protect him/her from a danger. In addition, the information processing system 100 outputs a warning when the user approaches or reaches out to a real object that is at risk of falling, such as a vase or a plant placed at a high location. This can protect an unspecified user from a danger.

(3) Prevention of Failure to Confirm Information

For example, the information processing system 100 displays a schedule for the next day, setting of an alarm time, a checklist for things left before going out, and the like at the timing when the second user lies on a bed in a bedroom or sits in a sofa in a living room. The second user can thus recognize information that has been conventionally managed on a notebook or a terminal device such as a smartphone, without opening the notebook or operating the terminal device. It is thus possible for the second user to prevent failure to confirm the information.

5. HARDWARE CONFIGURATION EXAMPLE

Figure 11:
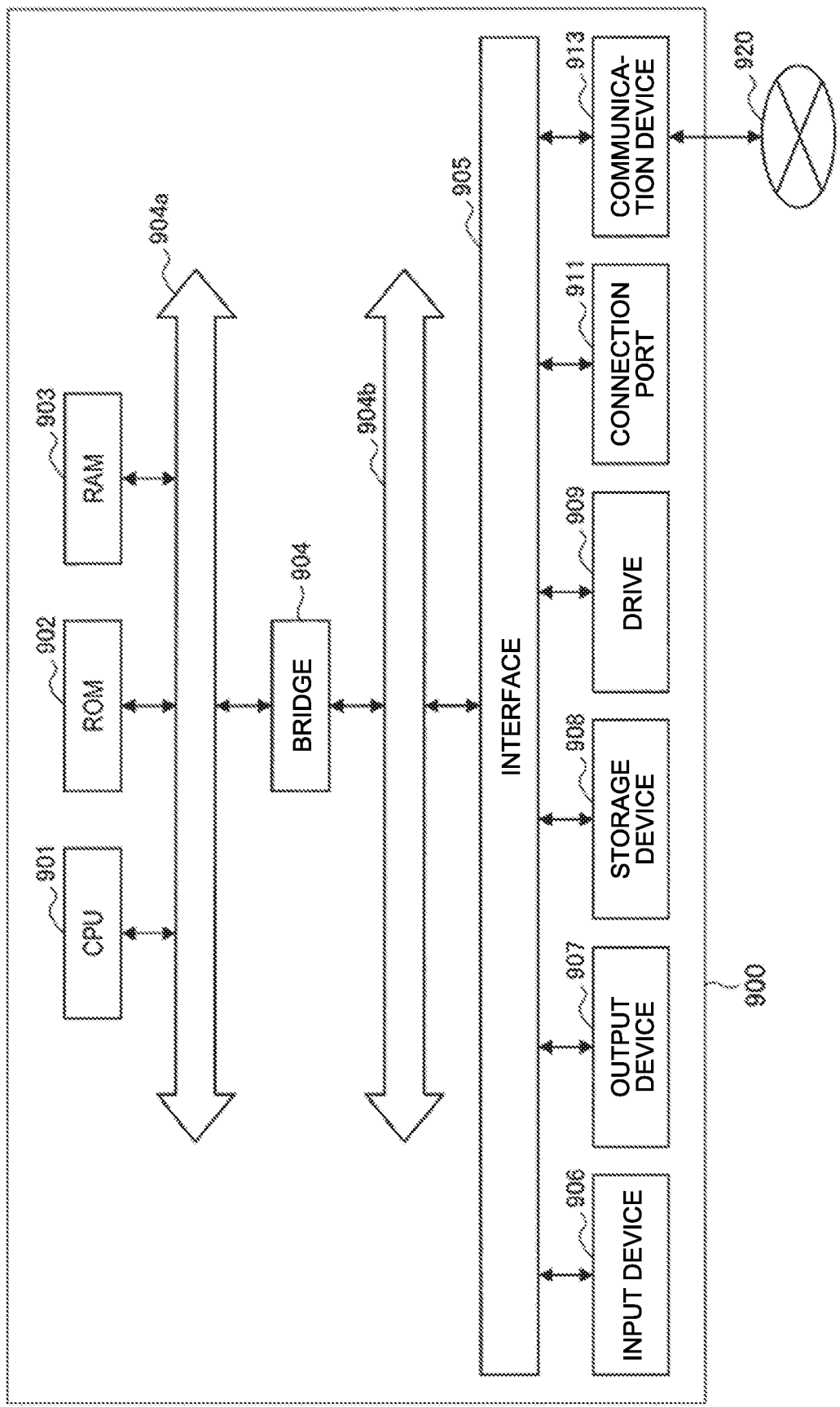
FIG. 11 is a block diagram illustrating an example of a hardware configuration of the information processing apparatus according to the present embodiment.

Finally, with reference to FIG. 11, a hardware configuration of the information processing apparatus according to the present embodiment will be described. FIG. 11 is a block diagram illustrating an example of a hardware configuration of the information processing apparatus according to the present embodiment. Note that an information processing apparatus 900 illustrated in FIG. 11 can implement the information processing system 100 illustrated in FIG. 2, for example. Information processing by the information processing system 100 according to the present embodiment is implemented by cooperation between software and hardware as described below.

As illustrated in FIG. 11, the information processing apparatus 900 includes a central processing unit (CPU) 901, a read only memory (ROM) 902, a random access memory (RAM) 903, and a host bus 904a. The information processing apparatus 900 also includes a bridge 904, an external bus 904b, an interface 905, an input device 906, an output device 907, a storage device 908, a drive 909, a connection port 911, and a communication device 913. The information processing apparatus 900 may include a processing circuit such as an electric circuit, a DSP, or an ASIC in place of or in addition to the CPU 901.

The CPU 901 functions as an arithmetic processing unit and a control unit, and controls the overall operation in the information processing apparatus 900 according to various programs. Furthermore, the CPU 901 may be a microprocessor. The ROM 902 stores programs used by the CPU 901, calculation parameters, and the like. The RAM 903 temporarily stores programs used in the execution of the CPU 901, parameters that appropriately change in the execution, and the like. The CPU 901 can form, for example, the acquisition unit 120, the setting unit 130, and the output control unit 150 illustrated in FIG. 2.

The CPU 901, the ROM 902, and the RAM 903 are mutually connected by the host bus 904a including a CPU bus and the like. The host bus 904a is connected to the external bus 904b, such as a peripheral component interconnect/interface (PCI) bus, via the bridge 904. The host bus 904a, the bridge 904, and the external bus 904b are not necessarily separately configured, and these functions may be implemented on one bus.

The input device 906 is implemented by, for example, a device such as a mouse, a keyboard, a touch panel, buttons, a microphone, a switch, and a lever to which information is input by the user. Furthermore, the input device 906 may be, for example, a remote control device using infrared rays or other radio waves, or may be an external connection device such as a mobile phone or a PDA corresponding to the operation of the information processing apparatus 900. Furthermore, the input device 906 may include, for example, an input control circuit that generates an input signal based on the information input by the user using the input means described above, and outputs the generated input signal to the CPU 901. The user of the information processing apparatus 900 can input various data to the information processing apparatus 900 and give an instruction on processing operations by operating the input device 906.

Alternatively, the input device 906 can be formed by a device that detects information about the user. Examples of the input device 906 can include various sensors such as an image sensor (for example, a camera), a depth sensor (for example, a stereo camera), an acceleration sensor, a gyro sensor, a geomagnetic sensor, an optical sensor, a sound sensor, a distance sensor, and a force sensor. Furthermore, the input device 906 may obtain information related to the state of the information processing apparatus 900 itself, such as the posture and movement speed of the information processing apparatus 900 and information related to the ambient environment of the information processing apparatus 900, such as brightness and noise around the information processing apparatus 900. Furthermore, the input device 906 may include a global navigation satellite system (GNSS) module that receives a GNSS signal from a GNSS satellite (for example, a global positioning system (GPS) signal from a GPS satellite), thereby measuring position information including the latitude, longitude, and altitude of the device. Furthermore, regarding the position information, the input device 906 may detect the position by performing transmission/reception via Wi-Fi (registered trademark), with mobile phones, PHSes, smartphones, or the like, or through short-range communication, or the like. The input device 906 can form, for example, the input unit 110 illustrated in FIG. 2.

The output device 907 is formed of a device capable of visually or aurally notifying the user of the acquired information. Examples of such devices include display devices such as CRT display devices, liquid crystal display devices, plasma display devices, EL display devices, laser projectors, LED projectors, and lamps; voice output devices such as speakers and headphones; and printer devices. The output device 907 outputs, for example, results obtained by various processes performed by the information processing apparatus 900. Specifically, the display device visually displays the results obtained by the various processes performed by the information processing apparatus 900 in various formats, such as text, image, table, and graph. The voice output device converts an audio signal composed of reproduced audio data, acoustic data, and the like into an analog signal and aurally outputs it. The output device 907 can form, for example, the output unit 160 illustrated in FIG. 2.

The storage device 908 is a device for data storage formed as an example of a storage unit of the information processing apparatus 900. The storage device 908 is implemented by, for example, a magnetic storage unit device such as an HDD, a semiconductor storage device, an optical storage device, a magneto-optical storage device, or the like. The storage device 908 may include a storage medium, a recording device that records data in the storage medium, a reading device that reads data from the storage medium, and a deletion device that deletes data recorded in the storage medium. The storage device 908 stores programs and various data executed by the CPU 901, various data acquired from the outside, and the like. The storage device 908 can form, for example, the storage unit 140 illustrated in FIG. 2.

The drive 909 is a reader/writer for a storage medium, and is built in or externally attached to the information processing apparatus 900. The drive 909 reads information recorded in a removable storage medium such as a mounted magnetic disk, optical disk, magneto-optical disk, or semiconductor memory, and outputs the information to the RAM 903. The drive 909 can also write information to a removable storage medium.

The connection port 911 is an interface connected to an external device, and serves as a connection port to an external device capable of transmitting data by universal serial bus (USB), for example.

The communication device 913 is, for example, a communication interface formed of a communication device or the like for connecting to a network 920. The communication device 913 is, for example, a communication card for a wired or wireless local area network (LAN), Long Term Evolution (LTE), Bluetooth (registered trademark), or wireless USB (WUSB). The communication device 913 may be a router for optical communication, a router for an asymmetric digital subscriber line (ADSL), a modem for various communications, or the like. The communication device 913 can transmit and receive signals and the like according to a predetermined protocol such as TCP/IP, for example, over the Internet or with another communication device. The communication device 913 can form, for example, the input unit 110 illustrated in FIG. 2. In the present embodiment, the communication device 913 reads a wireless identification tag, such as an RFID tag, attached to a real object in the physical space.

The network 920 is a wired or wireless transmission path of information transmitted from a device connected to the network 920. Examples of the network 920 may include the Internet, a public network such as a telephone network and a satellite communication network, various local area networks (LANs) including Ethernet (registered trademark), a wide area network (WAN), or the like. The network 920 may also include a dedicated line network such as an Internet protocol-virtual private network (IP-VPN).

Heretofore, an example of the hardware configuration capable of implementing the functions of the information processing apparatus 900 according to the present embodiment has been illustrated. Each component described above may be implemented using a general-purpose member, or may be implemented by hardware specialized for the function of each component. Therefore, it is possible to change the hardware configuration to be used as appropriate according to the technical level at the time of carrying out the present embodiment.

A computer program for implementing each function of the information processing apparatus 900 according to the present embodiment as described above can be created and implemented on a PC or the like. In addition, a computer-readable recording medium in which such a computer program is stored can be provided. Examples of the recording medium include a magnetic disk, an optical disk, a magneto-optical disk, a flash memory, and the like. Furthermore, the above-described computer program may be distributed via, for example, a network without using any recording medium.

6. CONCLUSION

The embodiment of the present disclosure has been described in detail above with reference to FIGS. 1 to 11. As described above, the information processing system 100 according to the present embodiment first sets setting information including notification information from the first user to the second user, the output location of the notification information in the physical space, and a notification condition that is a condition for outputting the notification information. Next, the information processing system 100 according to the present embodiment outputs the set notification information to the set output location when the set notification condition is satisfied, based on the set setting information. For example, the first user can make such a setting to output arbitrary information to an arbitrary location at an arbitrary timing in the second user's life scene, and the second user can receive the information at the timing and location set by the first user. In this way, a communication method using a physical space with a high degree of freedom is provided. The communication method with a high degree of freedom can further promote and also induce communication between users. Furthermore, the information processing system 100 is not limited to communication between different users, and can provide communication between the same users at different time points. In this way, interaction between the information processing system 100 and the user with a high degree of freedom is provided.

Since the notification information is output in the physical space, the second user can easily confirm the notification information without requiring an action such as operating a terminal device. The convenience of the second user is thus improved. Furthermore, the first user can transmit the information to be transmitted to the second user without missing the timing to transmit the information. Furthermore, since there is no need to operate a terminal device for communication, there is no device dependency. Therefore, information can be seamlessly shared between users.

The notification information may be output at a time point different from when it was set. Therefore, the first user and the second user can share different timelines.

The preferred embodiments of the present disclosure have been described in detail above with reference to the accompanying drawings, but the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

For example, each device described in the present specification may be implemented as a single device, or a part or all of the devices may be implemented as separate devices. For example, the information processing system 100 illustrated in FIG. 2 may be implemented as a single device or may be implemented as a plurality of devices. For example, the acquisition unit 120, the setting unit 130, the storage unit 140, and the output control unit 150 may be included in a server device connected to the input unit 110 and the output unit 160 installed in the physical space via a network or the like.

Furthermore, the processes described with reference to the flowcharts in the present specification are not necessarily executed in the order illustrated. Some process steps may be performed in parallel. Additional process steps may be employed, and some process steps may be omitted.

Furthermore, the advantageous effects described in the present specification are merely illustrative or exemplary and are not limiting. That is, the technology according to the present disclosure can exhibit other effects that are apparent to those skilled in the art from the description of the present specification in addition to or instead of the advantageous effects described above.

The following configurations also belong to the technical scope of the present disclosure.

(1)

An information processing apparatus comprising:

a setting unit that sets setting information including notification information from a first user to a second user, an output location of the notification information in a physical space, and a notification condition that is a condition for outputting the notification information; and an output control unit that controls an output device to output the notification information to the output location when the notification condition is satisfied, based on the setting information set by the setting unit.

(2)

The information processing apparatus according to (1), wherein the output control unit selects a type of the output device that outputs the notification information, based on at least one of information on the second user or information on the physical space.

(3)

The information processing apparatus according to (1) or (2), wherein the output control unit changes content of the notification information, based on at least one of information on the second user and information on the physical space.

(4)

The information processing apparatus according to any one of (1) to (3), wherein the output control unit updates content of the notification information to information at an output time point.

(5)

The information processing apparatus according to any one of (1) to (4), wherein the output control unit controls the output device to output information indicating the setting information that has been set to the output location set in the setting information.

(6)

The information processing apparatus according to any one of (1) to (5), wherein the output control unit controls the output device to output the notification information when the second user agrees to output the notification information.

(7)

The information processing apparatus according to any one of (1) to (6), wherein the output control unit controls the output device to output information indicating a response of the second user to the output notification information, to the first user.

(8)

The information processing apparatus according to any one of (1) to (7), wherein the setting unit sets the setting information, based on an action of the first user in the physical space.

(9)

The information processing apparatus according to (8), wherein the setting unit sets the setting information using a location specified by the first user in the physical space, as the output location or a location for which the notification condition is determined.

(10)

The information processing apparatus according to any one of (1) to (7), wherein the setting unit sets the setting information including the notification information corresponding to the output location.

(11)

The information processing apparatus according to any one of (1) to (7), wherein the setting unit sets the setting information using a location specified by the first user on a screen including an overhead view of the physical space, as the output location or a location for which the notification condition is determined.

(12)

The information processing apparatus according to (11), wherein, on the screen including an overhead view, information indicating the setting information that has been set is arranged at a location corresponding to the set output location.

(13)

The information processing apparatus according to (11) or (12), wherein the screen including an overhead view is displayed by a terminal device, and the setting information is set based on an input made by the first user to the terminal device.

(14)

The information processing apparatus according to any one of (1) to (13), wherein the output location is a relative location with respect to the second user.

(15)

The information processing apparatus according to any one of (1) to (14), wherein the notification condition includes information for specifying the second user, and includes a condition regarding at least one of a position or action of the second user in the physical space, a state of the physical space, or time.

(16)

The information processing apparatus according to any one of (1) to (15), wherein the first user and the second user are a same person.

(17)

The information processing apparatus according to any one of (1) to (16), wherein the output device includes a projection device, and the setting unit sets the setting information, based on an action of the first user on a screen projected in the physical space by the projection device.

(18)

An information processing method comprising:

setting information including notification information from a first user to a second user, an output location of the notification information in a physical space, and a notification condition that is a condition for outputting the notification information; and controlling an output device to output the notification information to the output location when the notification condition is satisfied, based on the setting information set.

(19)

A program for causing a computer to function as:

a setting unit that sets setting information including notification information from a first user to a second user, an output location of the notification information in a physical space, and a notification condition that is a condition for outputting the notification information; and an output control unit that controls an output device to output the notification information to the output location when the notification condition is satisfied, based on the setting information set by the setting unit.

REFERENCE SIGNS LIST

11 User, first user
12 User, second user
30 Physical space
40 Physical space
100 Information processing system
110 Input unit 120 Acquisition unit
121 Spatial information acquisition unit
122 User information acquisition unit
130 Setting unit
140 Storage unit
150 Output control unit
160 Output unit

The invention claimed is:

1. An information processing apparatus, comprising:
at least one processor configured to:
set, based on an input from a first user, setting information including notification information from the first user to a second user, an output location of the notification information in a physical space, and a notification condition that is a condition to output the notification information, wherein the output location corresponds to a surface of a real object in the physical space;
control an output device to output the notification information to the output location when the notification condition is satisfied, based on the setting information; and
change content associated with the notification information from the first user based on spatial information associated with the real object that corresponds to the output location.

2. The information processing apparatus according to claim 1, wherein the at least one processor is further configured to select a type of the output device that outputs the notification information, based on at least one of the user information associated with the second user or the spatial information associated with the real object in the physical space.

3. The information processing apparatus according to claim 1, wherein
the at least one processor is further configured to update content of the notification information to updated information at an output time of the notification information, and
the updated information indicates information that changes with one of time or a surrounding environment associated with the second user.

4. The information processing apparatus according to claim 1, wherein the at least one processor is further configured to control the output device to output information indicating the setting information that includes the set output location.

5. The information processing apparatus according to claim 1, wherein the at least one processor is further configured to control the output device to output the notification information when the second user agrees to output the notification information.

6. The information processing apparatus according to claim 1, wherein the at least one processor is further configured to control the output device to output information indicating a response, of the second user to the output notification information, to the first user.

7. The information processing apparatus according to claim 1, wherein the at least one processor is further configured to set the setting information based on an action of the first user in the physical space.

8. The information processing apparatus according to claim 7, wherein the at least one processor is further configured to set the setting information using a location specified by the first user in the physical space, as at least one of the output location or a location for which the notification condition is determined.

9. The information processing apparatus according to claim 1, wherein the at least one processor is further configured to set the setting information including the notification information corresponding to the output location.

10. The information processing apparatus according to claim 1, wherein the at least one processor is further configured to set the setting information using a location, specified by the first user on a screen including an overhead view of the physical space, as at least one of the output location or a location for which the notification condition is determined.

11. The information processing apparatus according to claim 10, wherein information indicating the setting information is at a position, on the screen including the overhead view, corresponding to the set output location.

12. The information processing apparatus according to claim 10, wherein
the screen including the overhead view is displayed by a terminal device, and
the setting information is set based on the input by the first user to the terminal device.

13. The information processing apparatus according to claim 1, wherein the output location is a relative location of the surface in the physical space with respect to the second user.

14. The information processing apparatus according to claim 1, wherein the notification condition includes information for identification of the second user, and a condition associated with at least one of a position of the second user in the physical space, an action of the second user in the physical space, a state of the physical space, or time.

15. The information processing apparatus according to claim 1, wherein the first user and the second user are a same person.

16. The information processing apparatus according to claim 1, wherein
the output device includes a projection device, and
the at least one processor is further configured to set the setting information based on an action of the first user on a screen projected in the physical space by the projection device.

17. An information processing method, comprising:
setting, based on an input from a first user, setting information including notification information from the first user to a second user, an output location of the notification information in a physical space, and a notification condition that is a condition to output the notification information, wherein the output location corresponds to a surface of a real object in the physical space;
controlling an output device to output the notification information to the output location when the notification condition is satisfied, based on the setting information; and
changing content associated with the notification information from the first user based on spatial information associated with the real object that corresponds to the output location.

18. A non-transitory computer-readable medium having stored thereon computer-executable instructions that, when executed by a processor, cause a computer to perform operations, comprising:
setting, based on an input from a first user, setting information including notification information from the first user to a second user, an output location of the notification information in a physical space, and a notification condition that is a condition to output the notification information, wherein the output location of the notification in the physical space is set by the first user via the setting information, wherein the output location corresponds to a surface of a real object in the physical space;

controlling an output device to output the notification information to the output location when the notification condition is satisfied, based on the setting information; and changing content associated with the notification information from the first user based on spatial information associated with the real object that corresponds to the output location.

\* \* \* \* \*